United States Patent
Schumann et al.

(10) Patent No.: US 12,099,185 B2
(45) Date of Patent: Sep. 24, 2024

(54) METHOD FOR CORRECTING A SPHERICAL ABERRATION OF A MICROSCOPE, AND MICROSCOPE

(71) Applicant: Leica Microsystems CMS GmbH, Wetzlar (DE)

(72) Inventors: Christian Schumann, Lich (DE); Ronja Capellmann, Wetzlar (DE); Alexander Weiss, Linden (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 702 days.

(21) Appl. No.: 17/285,479

(22) PCT Filed: Oct. 11, 2019

(86) PCT No.: PCT/EP2019/077615
§ 371 (c)(1),
(2) Date: Apr. 15, 2021

(87) PCT Pub. No.: WO2020/078845
PCT Pub. Date: Apr. 23, 2020

(65) Prior Publication Data
US 2021/0341735 A1    Nov. 4, 2021

(30) Foreign Application Priority Data
Oct. 19, 2018    (DE) .................... 10 2018 126 007.5

(51) Int. Cl.
*G02B 27/00* (2006.01)
*G02B 21/02* (2006.01)

(52) U.S. Cl.
CPC ......... *G02B 27/0068* (2013.01); *G02B 21/02* (2013.01)

(58) Field of Classification Search
None
See application file for complete search history.

(56) References Cited

U.S. PATENT DOCUMENTS 6,473,228 B1 * 10/2002 Toshimitsu .......... G02B 21/367
                                                            359/380
6,563,634 B2    5/2003 Shimada et al.
(Continued)

FOREIGN PATENT DOCUMENTS

DE    102010039746 B4    3/2012
DE    102013101711 A1    8/2014
(Continued)

OTHER PUBLICATIONS

P. Török et al., "Electromagnetic diffraction of light focused through a planar interface between materials of mismatched refractive indices: an integral representation", J. Opt. Soc. Am. A 12 (Feb. 1995), pp. 325-332, Optical Society of America, US.
(Continued)

*Primary Examiner* — Derek S. Chapel
(74) *Attorney, Agent, or Firm* — LEYDIG, VOIT & MAYER, LTD.

(57) ABSTRACT

A method is useable for correcting a spherical aberration of a microscope having an objective and a cover slip or object carrier, the objective having a correction element for correcting the spherical aberration. The method includes: ascertaining, by the microscope, an index of refraction of an optical medium bordering the cover slip or object carrier and/or a thickness of the cover slip or object carrier along an optical axis of the objective, ascertaining the spherical aberration based on the index of refraction of the optical medium and/or the thickness of the cover slip or object carrier, and ascertaining, based on the spherical aberration, a positioning variable, by which the correction element is adjusted so that the spherical aberration is corrected.

14 Claims, 2 Drawing Sheets

(56) References Cited

U.S. PATENT DOCUMENTS

| | | | |
|---|---|---|---|
| 9,411,142 B2 | 8/2016 | Ue et al. | |
| 2005/0024718 A1 | 2/2005 | Sase et al. | |
| 2008/0106795 A1* | 5/2008 | Shi ................... | G02B 27/0068 |
| | | | 359/656 |
| 2008/0310016 A1* | 12/2008 | Karasawa .......... | G02B 21/0088 |
| | | | 359/383 |
| 2016/0131900 A1 | 5/2016 | Pretorius | |
| 2018/0267300 A1 | 9/2018 | Goegler et al. | |
| 2020/0110254 A1 | 4/2020 | Goegler et al. | |

FOREIGN PATENT DOCUMENTS

| | | |
|---|---|---|
| DE | 10 2017 105926 A1 | 9/2018 |
| DE | 102017105928 A1 | 9/2018 |
| EP | 1 970 746 A1 | 9/2008 |
| EP | 1 988 417 A1 | 11/2008 |

OTHER PUBLICATIONS

ISO, "International Standard, Microscopes—Cover glasses—Part 1: Dimensional tolerances, thickness and optical properties," ISO 8255-1, second edition, Apr. 15, 2011, International Organization for Standardization, Switzerland, pp. 1-12.

Press, William H. et al., "Numerical Recipes, The Art of Scientific Computing", 3rd Edition, Cambridge University Press, UK, pp. 487-502, ISBN 0-521-88068-8, Sep. 2007.

P. Török et al., "Analytical solution of the diffraction integrals and interpretation of wave-front distortion when light is focused through a planar interface between materials of mismatched refractive indices," J. Opt. Soc. Am. A, vol. 12, No. 12, Dec. 1995, Optical Society of America, USA, pp. 2660-2671.

* cited by examiner

METHOD FOR CORRECTING A SPHERICAL ABERRATION OF A MICROSCOPE, AND MICROSCOPE

CROSS-REFERENCE TO PRIOR APPLICATIONS

This application is a U.S. National Phase Application under 35 U.S.C. § 371 of International Application No. PCT/EP2019/077615, filed on Oct. 11, 2019, and claims benefit to German Patent Application No. DE 102018126007.5, filed on Oct. 19, 2018. The International Application was published in German on Apr. 23, 2020 as WO 2020/078845 under PCT Article 21(2).

FIELD

The invention relates to a method for correcting a spherical aberration of a microscope having an objective and a cover slip or object carrier, in which a correction element arranged in the objective is provided to correct the spherical aberration. The invention furthermore relates to a microscope having a adjusting device for correcting a spherical aberration.

BACKGROUND

Sample-related aberrations, in particular index of refraction mismatch, are the main influence on the quality of a light-microscope image of a sample. The main causes of index of refraction mismatch in biological microscopy are a mismatched optical thickness of the cover slip and a mismatched index of refraction of an optical medium in which the sample is embedded.

A variety of objectives having correction means are known from the prior art, which are usable to compensate for a sample-induced spherical aberration.

A microscope having a correction lens for correcting aberrations, in particular of the thickness of a cover slip, a petri dish, or an object carrier are known from U.S. Pat. No. 6,563,634 B2. U.S. Pat. No. 6,563,634 B2 also discloses a method for correcting the location of a focal plane of the objective with the aid of the correction lens.

A method for adjusting a correction ring during focusing of a microscope is known from U.S. Pat. No. 9,411,142 B2. The method is based on an interpolation of support points which are given by settings of the correction ring, which an operator has to define. By means of this method, the course of the adjusting of the correction ring can be matched to the sample for samples having a large index of refraction variation. An accurate assessment and thus the ascertainment of the support points is complex and requires an experienced operator, however. Furthermore, generating a large number of images is necessary for the above-mentioned adjusting, which is unfavorable in particular in the case of light-sensitive samples, for example due to the bleaching of fluorescence or phototoxicity.

A microscope having an objective which has a correction lens, and an adjusting device for adjusting the correction lens, is known from US 2005/0024718 A1. The adjusting device sets the correction lens on the basis of an index of refraction of a sample input by the operator and a temperature measured in a sample chamber.

SUMMARY

In an embodiment, the present invention provides a method for correcting a spherical aberration of a microscope having an objective and a cover slip or object carrier, the objective having a correction element for correcting the spherical aberration. The method includes: ascertaining, by the microscope, an index of refraction of an optical medium bordering the cover slip or object carrier and/or a thickness of the cover slip or object carrier along an optical axis of the objective, ascertaining the spherical aberration based on the index of refraction of the optical medium and/or the thickness of the cover slip or object carrier, and ascertaining, based on the spherical aberration, a positioning variable, by which the correction element is adjusted so that the spherical aberration is corrected.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
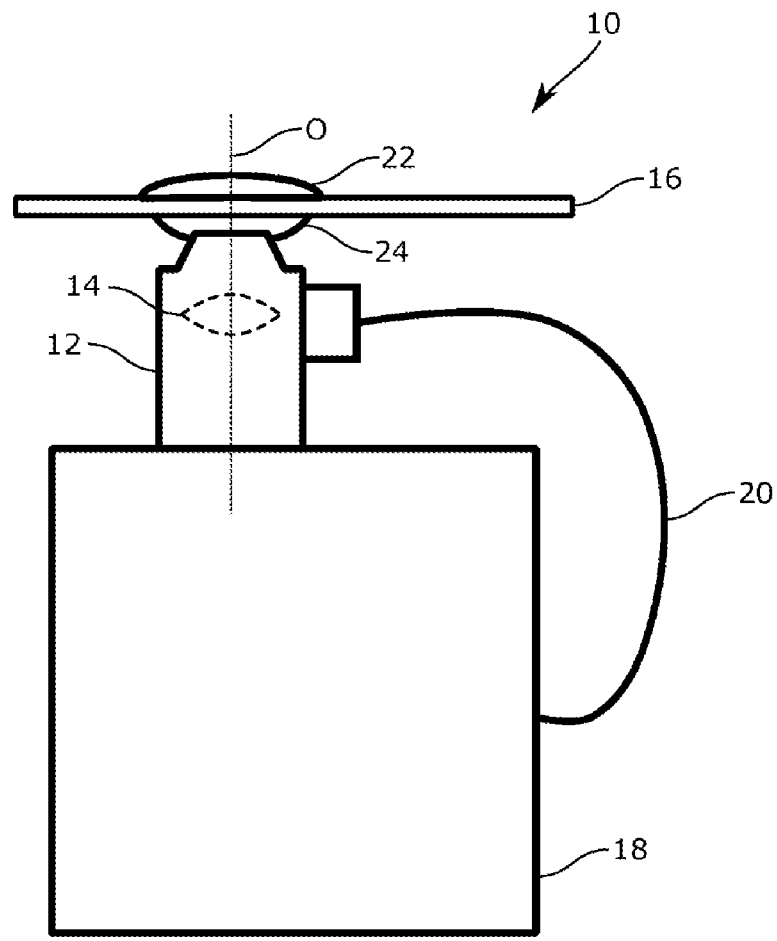
FIG. 1 shows a schematic illustration of a microscope as an exemplary embodiment.

Embodiments of the invention provide a method for correcting a spherical aberration of a microscope and a microscope having an adjusting device for correcting a spherical aberration, which enable correction in consideration of measurable properties of the sample and the sample chamber.

The method according to an embodiment of the invention is used for correcting a spherical aberration of a microscope having an objective and a cover slip or object carrier, in which a correction element (which can include multiple components and be referred to as correction means) arranged in the objective is provided for correcting the spherical aberration. The index of refraction of an optical medium bordering the cover slip or object carrier and/or the thickness of the cover slip or object carrier along the optical axis of the objective is ascertained by the microscope. The spherical aberration is ascertained on the basis of the index of refraction of the optical medium and/or the thickness of the cover slip or object carrier. A positioning variable is ascertained on the basis of the spherical aberration, by means of which the correction element is adjusted so that the spherical aberration is corrected.

A cover slip or object carrier is understood in this application in particular as a cover slip, an object carrier, a bottom of a petri dish, or a bottom of a well of a microtitration plate.

According to an embodiment of the invention, properties of the sample to be imaged and of the sample chamber, in particular the index of refraction of the optical medium and the thickness of the cover slip or object carrier, are determined by the microscope. The spherical aberration is then ascertained from the properties determined by the microscope. The ascertained spherical aberration is corrected or compensated for by an adjustment of the correction element.

The determination of the properties of the sample to be imaged and of the sample chamber by the microscope itself, i.e., in situ, is advantageous over known methods in which the ascertainment of the aberration takes place ex situ, for example with the aid of a reference preparation, since no correlation can be ensured here between the aberration ascertained with the aid of the reference preparation and aberrations during the imaging of the sample.

The aberration is ascertained, for example, by modeling a wavefront error from the properties of the sample and the sample chamber ascertained by the microscope. Models for wavefront errors based on properties of the sample and the sample chamber are known, for example, from P. Torok et al., "Electromagnetic diffraction of light focused through a planar interface between materials of mismatched refractive indices: an integral representation", J. Opt. Soc. Am. A 12 (1995), pages 325-332. The correction element can be adjusted on the basis of the ascertained spherical aberration in such a way that a further spherical aberration induced by the correction element compensates for the ascertained spherical aberration, whereby the ascertained spherical aberration is corrected.

In one preferred embodiment, the positioning variable, by means of which the correction element is adjusted, is ascertained by minimizing an overall aberration formed by the spherical aberration and a known further spherical aberration induced by the correction element.

In one preferred embodiment, a mechanical distance between the objective and an object plane is ascertained by the microscope and the spherical aberration is ascertained on the basis of this mechanical distance. The mechanical distance can be ascertained, for example, by means of a coded or automatic focus drive of the objective as soon as the position of the surface of the cover slip or object carrier facing toward the sample is known. This position can be ascertained, for example, using a suitable autofocus system. Alternatively, the mechanical distance between the objective and the object plane can be input by an operator.

In one particularly preferred embodiment, the ascertainment of the mechanical distance between the objective and the object plane, the ascertainment of the spherical aberration, and the ascertainment of the positioning variable, by means of which the correction element is adjusted, are carried out repeatedly for the object plane and/or further object planes. In particular, the ascertainment of the mechanical distance between the objective and the object plane, the ascertainment of the spherical aberration, and the ascertainment of the positioning variable are repeated in a continuous loop while the objective is adjusted to the object plane. In this way, a correction of the spherical aberration is also possible during a focusing procedure of the objective.

The spherical aberration is preferably ascertained on the basis of the index of refraction of the cover slip or object carrier. The index of refraction of the cover slip or object carrier is either previously known—the indices of refraction of various cover slips are standardized, for example, in ISO 8255-1—or is ascertained ex situ and then input to the microscope by an operator. The determination of the thickness of the cover slip or object carrier to ascertain the spherical aberration is particularly preferably carried out by the microscope itself.

An immersion medium is preferably introduced between the objective and the cover slip or object carrier. The spherical aberration is ascertained on the basis of the index of refraction of the immersion medium. The index of refraction of the immersion medium can be determined in particular by the microscope itself.

In one preferred embodiment, to ascertain the positioning variable, on the basis of which the correction element is adjusted, at least one value of the positioning variable and a value of the spherical aberration associated with the value of the positioning variable are provided by the objective. The value of the positioning variable can be calculated, for example, from optical data of the objective, or also ascertained by interferometry by means of an individual objective.

In one particularly preferred embodiment, the value of the spherical aberration associated with the value of the positioning variable is provided as a development coefficient of orthogonal polynomials, in particular Zernike polynomials. This is a particularly simple way to quantify the spherical aberration.

An embodiment of the invention furthermore relates to a microscope, comprising an objective having a correction element which is adjustable to correct a spherical aberration, and a cover slip or object carrier. The microscope has an adjusting device for adjusting the correction element. The adjusting device is designed to ascertain the index of refraction of an optical medium bordering the cover slip or object carrier and/or the thickness of the cover slip or object carrier along the optical axis of the objective, to ascertain a spherical aberration on the basis of the index of refraction of the optical medium and/or the thickness of the cover slip or object carrier, and to ascertain a positioning variable on the basis of the spherical aberration, by means of which the correction element is adjustable so that the spherical aberration is corrected.

The correction element preferably comprises at least one lens which is movable along the optical axis of the objective to correct aberrations.

FIG. 1 shows a microscope 10 as an exemplary embodiment. The microscope 10 has an objective 12, which is oriented on a cover slip 16. The objective 12 comprises a correction element 14, which is adjustable to correct an aberration and is designed, for example, as a lens, which is displaceable along the optical axis O of the objective 12. The microscope 10 furthermore comprises a control unit 18, which is connected via an external cable 20 to the objective 12 and which activates the various objective components.

An optical medium 22, in which a sample is embedded and which is referred to hereinafter as the embedding medium 22, is located on the cover slip 16. Furthermore, an immersion medium 24 is introduced between the objective 12 and the cover slip 16.

Figure 2:
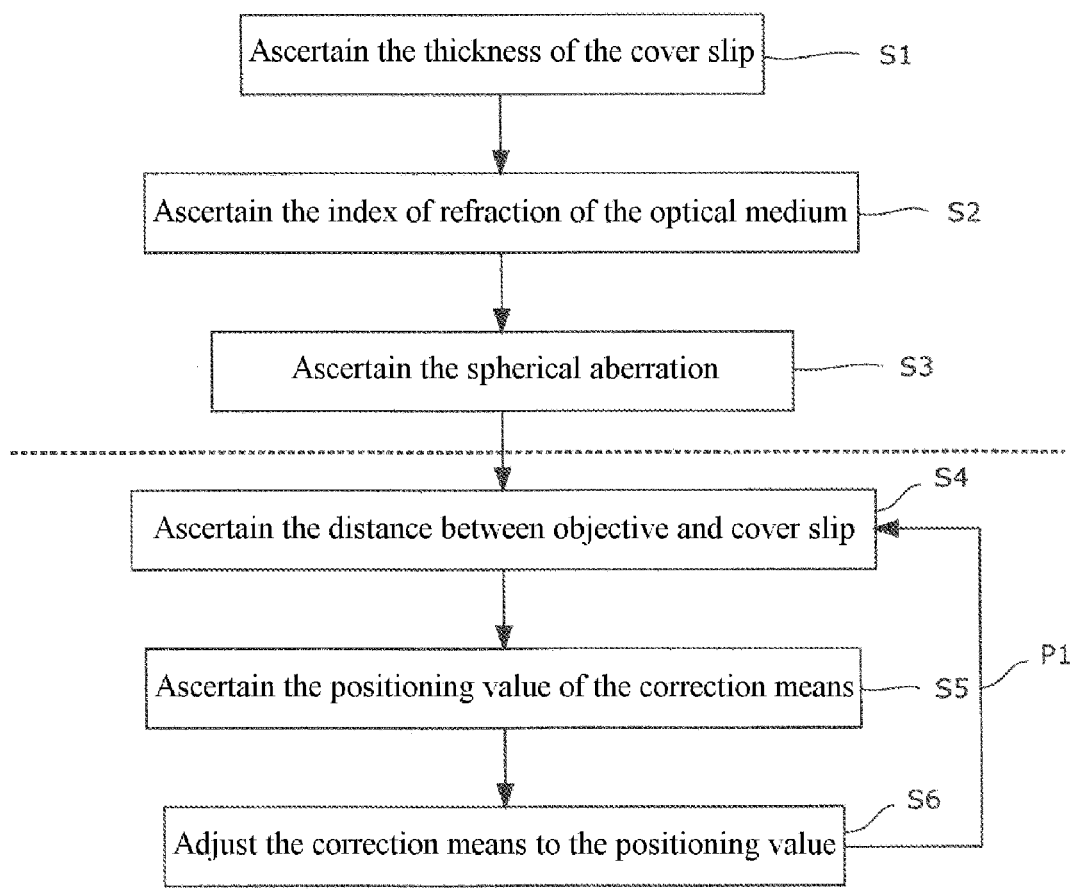
FIG. 2 shows a flow chart, which shows an embodiment of the method according to the invention for correcting a spherical aberration by means of the microscope according to FIG. 1.

FIG. 2 shows a flow chart which shows an embodiment of the method according to the invention for correcting a spherical aberration by means of the microscope 10 according to FIG. 1.

In a first step S1, the thickness of the cover slip 16 along the optical axis O of the objective 12 is ascertained. For this purpose, for example, a measurement light beam is deflected by the objective 12 onto the cover slip 16 with oblique incidence. Two spatially separate reflection light beams are generated by partial reflections of the measurement light beam at a first optical interface formed by the cover slip 16 and the immersion medium 24 and at a second optical interface formed by the cover slip 16 and the embedding medium 22. The two reflection light beams are received by the objective 12 and deflected onto a position-sensitive detector. The thickness of the cover slip can be ascertained on the basis of the detected locations of incidence of the two reflection beams on the position-sensitive detector.

In a second step S2, the index of refraction of the embedding medium 22 is ascertained. This can be carried out, for example, in that the intensities of the two reflection light beams generated in first step S1 are detected by means of the position-sensitive detector. The index of refraction of the embedding medium 22 can be ascertained on the basis of the detected intensities of the two reflection light beams, since the intensities of the two reflection light beams are dependent on the reflection and the transmission of the measurement light beam at the two interfaces, which are defined by the cover slip 16 and the embedding medium 22 or the immersion medium 24, respectively. The reflection and transmission processes, on which ultimately the intensities of the two reflection light beams spatially separate from one another are based, are thus essentially determined by the indices of refraction of the cover slip 16 and also of the embedding medium 22 and of the immersion medium 24.

In a third step S3, a spherical aberration is ascertained from the thickness of the cover slip 16 along the optical axis O of the objective and the index of refraction of the embedding medium 22.

The aberration can be determined in the form of a wavefront error from the index of refraction of the embedding medium 22 bordering the cover slip 16 and the thickness of the cover slip 16 along the optical axis O of the objective 12 as $$\psi(r) = z\sqrt{n_{Spc}^2 - r^2 NA^2} + \Delta d\sqrt{n_{Dgl}^2 - r^2 NA^2} - (z + \Delta d)\sqrt{n_{Imm}^2 - r^2 NA^2} \quad (1)$$

In this case, r is a radial coordinate of the exit pupil of the objective 12 scaled to the unit circle, z is a mechanical focal length, $n_{Spc}$ is the index of refraction of the embedding medium 22 bordering the cover slip 16, $n_{Imm}$ is the known index of refraction of the immersion medium 24 introduced between the objective and the cover slip, $\Delta d$ is the deviation of the cover slip thickness along the optical axis O of the objective 12 from the nominal thickness of the cover slip 16, and NA is the numeric aperture of the objective 12.

In a fourth step S4, a mechanical distance between the objective 12 and the cover glass 16 is ascertained by means of a coded focus drive of the objective 12 on the basis of the position of a surface of the cover slip 16 facing toward the sample. This position can be ascertained, for example, using a suitable autofocus system. Alternatively, the mechanical distance can be input by an operator.

In a fifth step S5, a positioning variable is ascertained on the basis of the spherical aberration determined in the third step S3, by means of which the correction element 14 is adjusted so that the spherical aberration is corrected. The positioning variable is ascertained in that a sum—also referred to as the total aberration hereinafter—is formed from the spherical aberration ascertained in the third step S3 and a further spherical aberration induced by the correction element 14, which is a function of solely the positioning variable, and the root mean square is minimized over the total pupil of this sum. The total aberration is thus also a function of solely the positioning variable. If both the ascertained spherical aberration and also the spherical aberration induced by the correction element are developed up to the Nth power according to Zernike polynomials, the root mean square of the total aberration may be written as $$\Sigma_{k=1}^{N} A_k [\phi_k(c) + \psi_k(z, n_{Spc}, \Delta d)]^2 \quad (2)$$

In this case, $A_k$ are scaling constants, $\psi_k$ are the coefficients of the Zernike polynomials of the ascertained spherical aberration, wherein k=0 corresponds to the coefficient of the Zernike polynomial $Z_0^0$, k=1 corresponds to the Zernike polynomial $Z_2^0$, etc. and $\phi_k$ are the coefficients of the Zernike polynomials of the spherical aberration induced by the correction element 14, which are dependent on the positioning variable denoted by c. The component of the pure defocus $$\psi_d(r) = 1/n_{Imm}^2 \sqrt{n_{Imm}^2 - NA^2}$$

is preferably removed from the development coefficients. By deriving equation (2), the following condition is obtained for an extreme value $$c_{opt} = -\frac{\sum_{k=1}^{N} A_k \psi_k(x, n_{Spc}, \Delta d)}{\sum_{k=1}^{N} A_k \phi_k} \quad (4)$$

Equation 3 can now be solved according to the optimum value of the positioning variable denoted hereinafter with $c_{opt}$, by means of which the correction element 14 can be adjusted so that the spherical aberration is corrected or compensated for. This can be carried out, for example, by means of iterative numeric methods, as are known, for example from "Numerical Recipes, The Art of Scientific Computing", Cambridge University Press, third edition 2007, pages 487 to 502, ISBN 0-521-88068-8. For the case of a series development up to the fourth power (N=4), $c_{opt}$ may even be analytically specified. In particular for the case that the coefficients $\varphi_k$ of the Zernike polynomials of the spherical aberration induced by the correction element 14 are only linearly dependent on the positioning variable or may be linearized in a suitable manner, the following solution is obtained $$0 = \sum_{k=1}^{N} A_k \frac{d\phi_k(c)}{dc} [\phi_k(c) + \psi_k(z, n_{Spc}, \Delta d)] \quad (3)$$

A series development of the ascertained spherical aberration and the spherical aberration induced by the correction element 14 is preferably carried out up to the tenth power (N=10). For this power, the required processing operations can be handled well numerically both for a linear dependence of $\phi_k(c)$ and also for a nonlinear dependence and are also implementable on simple components such as a PIC (programmable interrupt controller).

In a sixth step S6, the correction element 14 is adjusted to the positioning variable copy ascertained in the fifth step S5. In this way, the spherical aberration ascertained in the third step S3 is corrected.

The fourth to sixth steps S4, S5, S6 are carried out repeatedly for further object planes 12, as illustrated by an arrow P1 in FIG. 2.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 microscope
12 objective
14 correction element
16 cover slip
18 control unit
20 cable
22 embedding medium
24 immersion medium
P1 arrow

The invention claimed is:

1. A method for correcting a spherical aberration of a microscope having an objective and a cover slip or object carrier, the objective having a correction element for correcting the spherical aberration, the method comprising:
 ascertaining, by the microscope, an index of refraction of an embedding medium embedding a sample and bordering the cover slip or object carrier and a thickness of the cover slip or object carrier along an optical axis of the objective by:
  directing a measurement light beam via the objective onto the cover slip or object carrier at an oblique incidence, resulting in two reflection beams at two surfaces of the cover slip or object carrier, and
  measuring spatial and intensity properties of the two reflection beams, wherein the index of refraction of the embedding medium and the thickness of the cover slip or object carrier are ascertained based on the spatial and intensity properties of the two reflection beams,
 ascertaining the spherical aberration based on the index of refraction of the embedding medium and the thickness of the cover slip or object carrier, and
 ascertaining, based on the spherical aberration, a positioning variable, by which the correction element is adjusted so that the spherical aberration is corrected.

2. The method as claimed in claim 1, wherein the positioning variable, by which the correction element is adjusted, is ascertained in that a total aberration formed by the spherical aberration and a known further spherical aberration induced by the correction element is minimized.

3. The method as claimed in claim 1, wherein a mechanical distance between the objective and an object plane is ascertained by the microscope, and the spherical aberration is ascertained on the basis of the mechanical distance.

4. The method as claimed in claim 3, wherein the ascertainment of the mechanical distance between the objective and the object plane, the ascertainment of the spherical aberration, and the ascertainment of the positioning variable, by which the correction element is adjusted, are carried out repeatedly for the object plane and/or further object planes.

5. The method as claimed in claim 1, wherein the spherical aberration is ascertained further based on an index of refraction of the cover slip or object carrier.

6. The method as claimed in claim 1, wherein an immersion medium is introduced between the objective and the cover slip or object carrier, and the spherical aberration is ascertained based on an index of refraction of the immersion medium.

7. The method as claimed in claim 1, wherein, to ascertain the positioning variable, by which the correction element is adjusted, at least one value of the positioning variable and a value of the spherical aberration associated with the value of the positioning variable are provided by the objective.

8. The method as claimed in claim 7, wherein the value of the spherical aberration associated with the value of the positioning variable is provided as development coefficients of orthogonal polynomials.

9. The method as claimed in claim 1, wherein the thickness of the cover slip or object carrier along the optical axis of the objective is ascertained by measuring locations of the two reflection beams on a position-sensitive detector.

10. The method as claimed in claim 9, wherein the index of refraction of the embedding medium is ascertained by measuring intensities of the two reflection beams detected by the position-sensitive detector.

11. A microscope, comprising:
 an objective having a correction element, which is adjustable to correct a spherical aberration,
 a cover slip or object carrier,
 a position-sensitive detector, and
 an adjusting device configured to adjust the correction element, the adjusting device being configured to:
  ascertain an index of refraction of an embedding medium embedding a sample and bordering the cover slip or object carrier and a thickness of the cover slip or object carrier along an optical axis of the objective, by:
   directing a measurement light beam via the objective onto the cover slip or object carrier at an oblique incidence, resulting in two reflection beams at two surfaces of the cover slip or object carrier, the two reflection beams being recorded at the position-sensitive detector, and
   measuring spatial and intensity properties of the two reflection beams on the position-sensitive detector, wherein the index of refraction of the embedding medium and the thickness of the cover slip or object carrier are ascertained based on the spatial and intensity properties of the two reflection beams,
  ascertain a spherical aberration based on the index of refraction of the embedding medium and the thickness of the cover slip or object carrier, and
  ascertain a positioning variable based on the spherical aberration, by which the correction element is adjusted so that the spherical aberration is corrected.

12. The microscope as claimed in claim 11, wherein the correction element comprises at least one lens, which is movable along the optical axis of the objective to correct the spherical aberration.

13. The microscope as claimed in claim 11, wherein the thickness of the cover slip or object carrier along the optical axis of the objective is ascertained by measuring locations of the two reflection beams on a position-sensitive detector.

14. The microscope as claimed in claim 11, wherein the index of refraction of the embedding medium is ascertained by measuring intensities of the two reflection beams detected by the position-sensitive detector.

* * * * *